(12) United States Patent
Kubik et al.

(10) Patent No.: US 8,676,405 B2
(45) Date of Patent: Mar. 18, 2014

(54) EXTERNAL LOAD INVERSE PLANT

(75) Inventors: Stephen Kubik, Milford, CT (US); Vineet Sahasrabudhe, Cheshire, CT (US); Alex Faynberg, Cheshire, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 472 days.

(21) Appl. No.: 13/010,291

(22) Filed: Jan. 20, 2011

(65) Prior Publication Data
US 2012/0136512 A1   May 31, 2012

Related U.S. Application Data

(60) Provisional application No. 61/340,919, filed on Mar. 23, 2010.

(51) Int. Cl.
*G01C 23/00* (2006.01)
*G05D 1/00* (2006.01)
*G06F 7/00* (2006.01)

(52) U.S. Cl.
USPC ............ 701/3; 701/1; 701/4; 701/5; 701/6; 701/11; 701/15; 701/16; 701/18

(58) Field of Classification Search
USPC ............ 701/3, 44, 57, 27, 40, 46, 58, 60, 10; 700/29, 28, 48, 50, 54, 55; 706/2, 3, 6, 706/4, 5, 13; 244/164, 17.11, 26, 3, 171
See application file for complete search history.

(56) References Cited

U.S. PATENT DOCUMENTS

| | | | | |
|---|---|---|---|---|
| 3,756,543 A * | 9/1973 | Fowler et al. | ................. | 244/177 |
| 3,833,189 A * | 9/1974 | Fowler et al. | ................. | 244/177 |
| 3,904,156 A * | 9/1975 | Smith | ................. | 244/118.1 |
| 3,946,971 A * | 3/1976 | Chadwick | ................. | 244/137.4 |
| 4,780,838 A * | 10/1988 | Adelson | ................. | 702/174 |
| 5,465,925 A * | 11/1995 | Connolly et al. | ........... | 244/137.1 |
| 7,954,766 B2 * | 6/2011 | Brainard et al. | .............. | 244/194 |
| 8,185,259 B2 * | 5/2012 | Omar | ................. | 701/3 |
| 8,190,307 B2 * | 5/2012 | Omar | ................. | 701/4 |
| 8,413,923 B2 * | 4/2013 | Brenner et al. | ............. | 244/17.13 |
| 2007/0200032 A1 * | 8/2007 | Eadie et al. | ................. | 244/137.4 |

* cited by examiner

*Primary Examiner* — Bhavesh V Amin
(74) *Attorney, Agent, or Firm* — Cantor Colburn LLP

(57) ABSTRACT

A method of controlling the flight of a rotorcraft in a feed-forward/feedback architecture includes utilizing an aircraft plant model to control the rotorcraft performance; determining when an external load is coupled to the rotorcraft; and modifying an inverse plant when the external load is present.

10 Claims, 2 Drawing Sheets

EXTERNAL LOAD INVERSE PLANT

CROSS-REFERENCE TO RELATED APPLICATIONS

This application claims the benefit of U.S. provisional patent application Ser. No. 61/340,919, filed Mar. 23, 2010, the entire contents of which are incorporated herein by reference.

STATEMENT REGARDING FEDERALLY SPONSORED RESEARCH OR DEVELOPMENT

This invention was made with Government support under N00019-06-C-0081 awarded by The United States Navy. The Government has certain rights in this invention.

BACKGROUND

The present invention relates to aircraft flight controls, and more particularly to aircraft flight control laws.

Some helicopters are tasked with performing missions involving the lifting of heavy external loads. Often, these heavy loads are suspended from a helicopter via a hook and cable assembly. In the past, there have been efforts to analyze the external loads and characterize their impact on helicopter handling qualities and dynamic stability margins. One method of compensating for external loads utilizes cable angle feedback, i.e., monitoring the angle of the cable holding the external load in relation to the centerline of the aircraft, to determine the dynamics of the load and then compensates the helicopter based on the mission. Direct feedback of the external load can be used in a similar manner. Unfortunately, these systems require mechanical and electronic measurement devices. Further, if the aircraft control systems track inputs via high gain feedback to improve aircraft handling, then these systems can enter a state of excitation causing an increasing oscillation in the suspended load. This risk of oscillations increases as the discrepancy between pilot or autopilot input and actual aircraft performance increases.

Consequently, there is a need for a system that increases helicopter control and stability without the additional risk of inducing oscillations in the suspended load cable.

SUMMARY OF THE INVENTION

An embodiment of the present invention includes a method of controlling the flight of a rotorcraft in a feed-forward/feedback architecture comprising: utilizing an aircraft plant model to control the rotorcraft performance; determining when an external load is coupled to the rotorcraft; and modifying an inverse plant when the external load is present.

Another embodiment includes a system for controlling the flight of a rotorcraft in a feed-forward/feedback architecture comprising: an inverse plant to control the rotorcraft performance; a detector detecting an external load coupled to the rotorcraft; and a modified inverse plant for use when an external load is detected.

The present invention seeks to improve helicopter handling qualities though an aircraft feed-forward approximation that recovers handling qualities performance without modifying the feedback stability of the aircraft. Additionally, the present invention utilizes software to augment the helicopter without requiring special hardware beyond information that an external load is present.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

The present invention augments an aircraft plant model to improve the handling qualities of a helicopter by approximating load dynamics of an externally slung load. One objective of the present invention is to approximate pendulum mode dynamics for the externally slung load in a feed-forward/feedback architecture such that gains increases are not necessary for improving the handling qualities.

The present invention can be implemented, but not limited to, a model following architecture for a helicopter fly-by-wire system. As is known, model following architecture disassociates manual control input with aircraft output to make aircraft responses more intuitive and manageable. An inverse plant provides a prediction of the aircraft's generated body rate to stick or pedal inputs in the model-following architecture.

Figure 1:
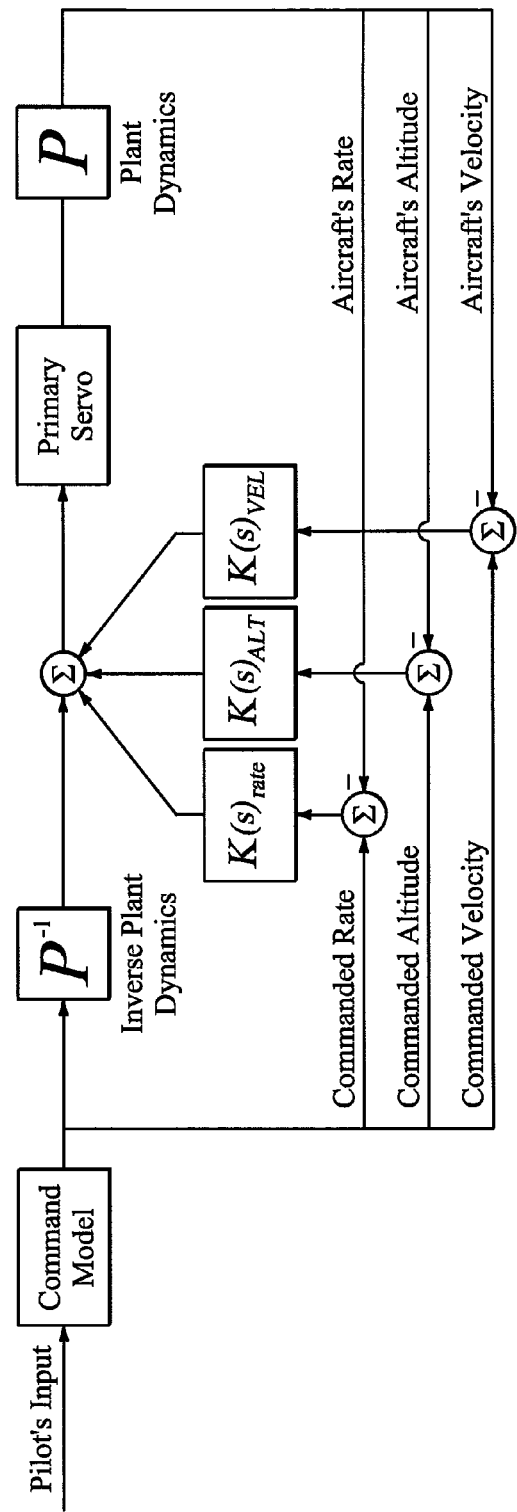
FIG. 1 is a high level block diagram of fly-by-wire control laws according to the present invention.

Using the fundamental architecture of model-following control laws, as demonstrated in FIG. 1, the potential exists to modify the inverse plant based on known changes in the plant dynamics. This allows for continued cancellation of dynamics between the plant and inverse plant, thus reducing the workload on the feedback loops.

In the instance of slung load dynamics, information provided for a slung load presence can trigger additional augmentation in the aircraft plant model to improve the performance reduced through feedback gain reductions.

Since the inverse plant is based off an aircraft approximation, rate and attitude feedback are also used to compensate for any error between an aircraft's actual and commanded values. Traditionally, it is these components that are modified when augmenting the architecture for external slung loads.

Figure 2:
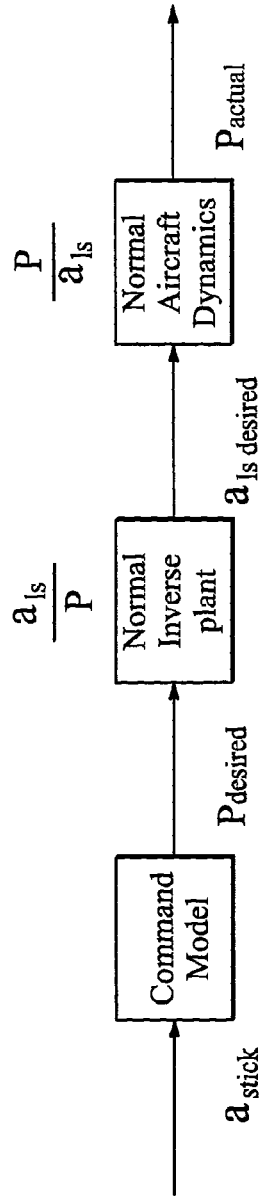
FIG. 2 is a block diagram of a roll axis feed-forward unaugmented with nominal aircraft plant according to the present invention.
Figure 3:
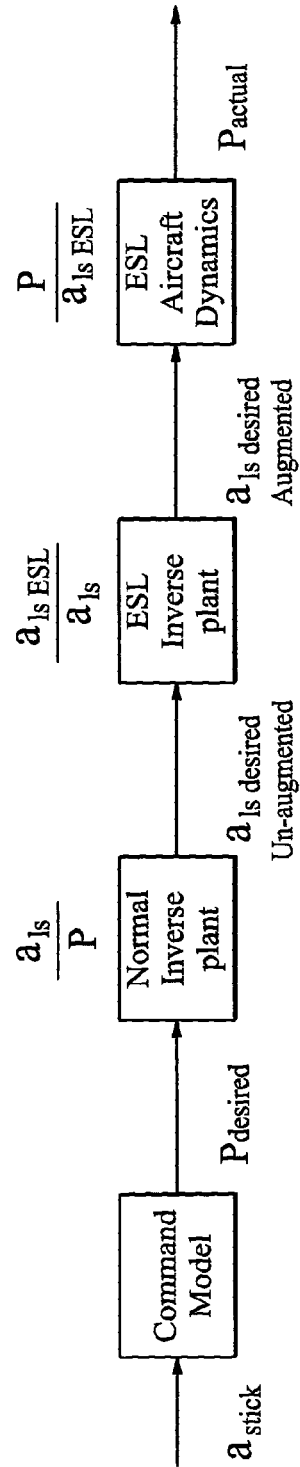
FIG. 3 is a block diagram of a roll axis feed-forward augmented for external slung load according to the present invention.

In one embodiment, the pendulum mode was selected as the most feasible slung load dynamic to model. This is because, in external load dynamics, the pendulum mode is the most critical mode effecting nominal operation Along with being one of the higher contributors to stability margin losses at high external load weights, the pendulum mode has a relatively predictable frequency response and is present in both single and dual point slung load operations. Utilizing a simulation model, a nominal roll pendulum mode model is selected from all potential slung load conditions. The mode is then modeled and then inverted as augmentation to the standard inverse plant as shown in the difference between FIG. 2 and FIG. 3. Generally, a slung load can be modeled using a second order over second order transfer function to capture the pendulum oscillations. However, high order models can be utilized to capture the external load dynamics if the types of external loads can be specifically identified i.e. single point, dual point, triple point, etc.

For generation of a second order approximation of an external load inverse plant time, a two step process is required. The first step is formation of the transfer function time constants. Relying on these slung load models, the following equations (1) and (2) are used to determine the inverted dynamics to be introduced into the control system.

Defined by the equations $P_R \pm P_I$ for the 2 poles and $Z_R \pm Z_I$ for the 2 zeros $P_R$: Real component of the pole location
$P_I$: Positive imaginary component of the pole location
$Z_R$: Real component of the zero location
$Z_I$: Positive imaginary component of the zero location $$TC_1 = 1$$
$$TC_2 = -2 \cdot P_R$$
$$TC_3 = (P_R)^2 + (P_I)^2$$
$$TC_4 = 1$$
$$TC_5 = -2 \cdot Z_R$$
$$TC_6 = (Z_R)^2 + (Z_I)^2 \quad (1)$$

$\delta_{Inv}$: Normal inverse plant stick command, input (in.)
$\delta_{ESL}$: External load augmented stick command, output (in.)
Defined as the pendulum mode approximation inverted transfer function $$\frac{\delta_{ESL}}{\delta_{Inv}} = \frac{TC_1 \cdot s^2 + TC_2 \cdot s + TC_3}{TC_4 \cdot s^2 + TC_5 \cdot s + TC_6} \quad (2)$$

Once the transfer function is generated, the second phase of populating the inverse plant values comes with finding the appropriate system gain.

In one embodiment, the external load augmentation is implemented using flight control laws software. As an example comparison, the same case with external load gain scheduling is compared with a scenario where both gain scheduling and the current inverse plant augmentation is enabled. The results demonstrate that augmentation in the feed-forward path produces no impact on the stability margins. The benefit, however, is a general increase in the pitch and roll bandwidth numbers where the inverse plant augmentation exists.

The inverse plant augmentation is a general implementation for a range of external load configurations. Instead of this general external load plant addition, the possibility remains to target the dynamics as a function of external load weight for more drastic improvements, if required. One possible advantage to the application of the external load inverse plant is that it will increase handling qualities for externally slung load aircraft without sacrificing stability margins and only require an interface to enable augmentation. Engagement of this augmentation can be either manual or automatic. In the instance of automatic selection, sensed total external load weight can be compared against a preset threshold to augment the control system in the presence of a substantially sized slung load.

Augmentation of this form is robust for the majority of dual point configurations and produces marked improvements for handling qualities in linear analysis.

There are two essential differences between existing methods and the control scheme of the present invention. First, rather than direct feedback of the external load state, the control system seeks to only a load dynamics estimation to enable the external load augmentation and then provide compensation through the external load inverse plant. Second, the augmentation works within a feed-forward/feedback structure to provide an improved feed-forward command without impact to the feedback gains in an attempt to compensate for limitations of the aircraft model approximation.

The present invention can be implemented on all helicopters with a full-authority fly by wire control system but application to legacy partial control authority systems is also possible.

When an inverse plant approximation of the external load pendulum mode has been implemented in the control laws, it creates a feed-forward command, which accommodates for the swinging motion of the load, thus resulting in a performance increase for the pilot. These results are apparent in bandwidth/phase delay. High stability margins are achieved by having a separate gain table scheduled with detected external load weight. This has allowed much better stability margins than it was though possible and leads to a balanced design with good handling qualities that do not suffer from low stability margins.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of controlling the flight of a rotorcraft in a feed-forward/feedback architecture comprising:
   utilizing an aircraft plant model to control the rotorcraft performance;
   determining when an external load is coupled to the rotorcraft; and
   modifying an inverse plant, via a processor, when the external load is present;
   wherein modifying the inverse plant includes providing an external slung load inverse plant to augment an output of a normal inverse plant.

2. A method of controlling the flight of a rotorcraft in a feed-forward/feedback architecture comprising:
   utilizing an aircraft plant model to control the rotorcraft performance;
   determining when an external load is coupled to the rotorcraft; and
   modifying an inverse plant, via a processor, when the external load is present, the modifying the inverse plant includes providing an external slung load inverse plant along with a normal inverse plant;
   wherein the external slung load inverse plant is based on a nominal roll pendulum mode model.

3. A method of controlling the flight of a rotorcraft in a feed-forward/feedback architecture comprising:
   utilizing an aircraft plant model to control the rotorcraft performance;
   determining when an external load is coupled to the rotorcraft; and
   modifying an inverse plant, via a processor, when the external load is present, the modifying the inverse plant includes providing an external slung load inverse plant along with a normal inverse plant;

wherein an output of the normal inverse plant is provided as an input to the external slung load inverse plant.

4. A method of controlling the flight of a rotorcraft in a feed-forward/feedback architecture comprising:
utilizing an aircraft plant model to control the rotorcraft performance;
determining when an external load is coupled to the rotorcraft; and
modifying an inverse plant, via a processor, when the external load is present, the modifying the inverse plant includes providing an external slung load inverse plant along with a normal inverse plant;
wherein the normal inverse plant and a second order external slung load inverse plant are related based on the second order equation $$\frac{\delta_{ESL}}{\delta_{Inv}} = \frac{TC_1 \cdot s^2 + TC_2 \cdot s + TC_3}{TC_4 \cdot s^2 + TC_5 \cdot s + TC_6}$$

$\delta_{Inv}$ being a normal inverse plant stick command input;
$\delta_{ESL}$ being an external load augmented stick command output; and
$TC_1$ through $TC_6$ being transfer function time constants.

5. The method of claim 1 wherein:
determining an external load coupled to the rotorcraft includes sensing an external load weight at cargo hooks or manual selection.

6. A system for controlling the flight of a rotorcraft in a feed-forward/feedback architecture comprising:
an inverse plant to control the rotorcraft performance;
a detector detecting an external load coupled to the rotorcraft; and
a modified inverse plant for use when an external load is detected;
wherein the modified inverse plant includes an external slung load inverse plant to augment an output of a normal inverse plant.

7. A system for controlling the flight of a rotorcraft in a feed-forward/feedback architecture comprising:
an inverse plant to control the rotorcraft performance;
a detector detecting an external load coupled to the rotorcraft; and
a modified inverse plant for use when an external load is detected, the modified inverse plant includes an external slung load inverse plant along with a normal inverse plant;
wherein the external slung load inverse plant is based on a nominal roll pendulum mode model.

8. A system for controlling the flight of a rotorcraft in a feed-forward/feedback architecture comprising:
an inverse plant to control the rotorcraft performance;
a detector detecting an external load coupled to the rotorcraft; and
a modified inverse plant for use when an external load is detected, the modified inverse plant includes an external slung load inverse plant along with a normal inverse plant;
wherein an output of the normal inverse plant is provided as an input to the external slung load inverse plant.

9. A system for controlling the flight of a rotorcraft in a feed-forward/feedback architecture comprising:
an inverse plant to control the rotorcraft performance;
a detector detecting an external load coupled to the rotorcraft; and
a modified inverse plant for use when an external load is detected, the modified inverse plant includes an external slung load inverse plant along with a normal inverse plant;
wherein the normal inverse plant and the external slung load inverse plant are related based on the equation $$\frac{\delta_{ESL}}{\delta_{Inv}} = \frac{TC_1 \cdot s^2 + TC_2 \cdot s + TC_3}{TC_4 \cdot s^2 + TC_5 \cdot s + TC_6}$$

$\delta_{Inv}$ being a normal inverse plant stick command input;
$\delta_{ESL}$ being an external load augmented stick command output; and
$TC_1$ through $TC_6$ being transfer function time constants.

10. The system of claim 6 wherein:
the detector detects an external load weight at cargo hooks.

* * * * *